United States Patent [19]

Sasaki

[11] Patent Number: 4,965,663
[45] Date of Patent: Oct. 23, 1990

[54] METHOD FOR MEASURING OF CHROMATIC OPTICAL DENSITY

[75] Inventor: Takashi Sasaki, Tokyo, Japan

[73] Assignee: Canon Kabushiki Kaisha, Japan

[21] Appl. No.: 481,696

[22] Filed: Feb. 20, 1990

Related U.S. Application Data

[63] Continuation of Ser. No. 348,077, May 1, 1989, abandoned, which is a continuation of Ser. No. 794,184, Nov. 1, 1985, abandoned.

[30] Foreign Application Priority Data

Nov. 8, 1984 [JP] Japan .................................. 59-235599
Nov. 15, 1984 [JP] Japan .................................. 59-242158

[51] Int. Cl.$^5$ .............................................. H04N 1/46
[52] U.S. Cl. ........................................ 358/80; 358/75
[58] Field of Search ................................... 358/75, 80

[56] References Cited

U.S. PATENT DOCUMENTS

| | | | |
|---|---|---|---|
| 4,060,829 | 11/1977 | Sakamoto | 358/80 |
| 4,136,360 | 1/1979 | Hoffrichter et al. | 358/80 |
| 4,409,614 | 10/1983 | Eichler et al. | 358/80 |
| 4,558,356 | 12/1985 | Toda et al. | 358/80 |
| 4,622,582 | 11/1986 | Yamada | 358/80 |
| 4,631,578 | 12/1986 | Sasaki et al. | 358/80 |
| 4,679,074 | 7/1987 | Sugiura et al. | 358/80 |
| 4,717,954 | 1/1988 | Fujita et al. | 358/80 |

OTHER PUBLICATIONS

Japan Industrial Standard, JIS Z8722-1982, "Methods of Measurement for Color of Reflecting or Transmitting Objects", English translation.

Primary Examiner—James J. Groody
Assistant Examiner—Mark R. Powell
Attorney, Agent, or Firm—Fitzpatrick, Cella, Harper & Scinto

[57] ABSTRACT

A method of optically measuring chromatic densities of a sample. In the method, three stimulus values, X, Y and Z, of light reflected from the sample, are derived. A cyan density, a magenta density and a yellow density are determined for the sample, using the X, Y and Z stimulus values, and in addition, three stimulus values, Xo, Yo and Zo of a standard color, such as white. With this method, a color image of an original picture may be accurately reproduced with a high fidelity.

11 Claims, 7 Drawing Sheets

METHOD FOR MEASURING OF CHROMATIC OPTICAL DENSITY

This application is a continuation of application Ser. No. 07/348,077 filed May 1, 1989, now abandoned, which was a continuation of application Ser. No. 06/794,184 filed Nov. 1, 1985, now abandoned.

BACKGROUND OF THE INVENTION

1. Field of the Invention

The present invention relates to a color image processing method.

Although the present invention will be described hereinbelow with respect to a video printer, the invention can be applied to any apparatus such as a color copying machine, color scanner, color printing apparatus, etc. if they obtain a color image in a manner such that an original picture or object is photoelectrically scanned to obtain a color component signal and this signal is subjected to a color process such as a masking or the like, as will be explained hereinafter.

The present invention also relates to a method of measuring an optical density regarding color lights.

2. Description of the Prior Art

FIG. 1 shows a conceptional diagram of a color reproducing method in such conventional apparatuses. First, the light component of an original 10 on a rotary drum 11 is separated into three colors by mirrors 13 and filters 12R, 12G, and 12B of R, G and B, thereby obtaining three primary color signals (R, G, B) by photoelectric converters 14R, 14G, and 14B.

Next, these (R, G, B) signals are subjected to arithmetic operations as shown in expressions (1) by a complementary converting section 6, and they are converted to densities (Dc, Dm, Dy) of the complementary colors (cyan, magenta, yellow) of each color.

$$\begin{aligned} Dc &= -\log(R/R_0) \\ Dm &= -\log(G/G_0) \\ Dy &= -\log(B/B_0) \end{aligned} \quad (1)$$

($R_0$, $G_0$, and $B_0$ are values of R, G, and B which give white of the highest brightness).

Next, when the density values of the respective colors determined in this manner are reproduced on a paper, a mesh ratio of each size is controlled by a density-output converting section 7 by use of a masking process or the like so that desired densities (Dc, Dm, Dy) are obtained in the case of, e.g., printing or the like. Vc, Vm, and Vy are signals indicative of amounts of inks of cyan, magenta, and yellow. Although black may be used as necessary, in this case as well, amounts of inks of cyan, magenta, yellow, and black are eventually needed to be controlled to obtain desired densities (Dc, Dm, Dy).

Such a conventional method has a problem in that there is no regard to the relationship between the three primary color systems R, G, and B which were separated into three colors and the densities (Dc, Dm, Dy) of their complementary colors and no counterplan is taken to correct a deviation in color reproduction which is caused due to this.

For three-color separated signals R, G, and B even if the same signal is input, it will have become quite different color signals depending on a color filter which is used for three-color separation due to the spectral characteristic of the color filter.

In addition, for the densities Dc, Dm, and Dy of their complementary colors as well, if the spectral filters used in a densitometer which is used for measurement are not specified, even if the same density is measured, it will have become a quite different value depending on the densitometer which is used.

For example, it is assumed that two samples I and II of different spectral reflectivities are prepared. In this case, assuming that the spectral characteristics of the filter to red, green, and blue of the densitometer are $R_\lambda$, $G_\lambda$, and $B_\lambda$, the respective density values of each sample become as follows.

$$\begin{aligned} D_{ci} &= -\log(\int \rho\lambda i\, R\lambda\, P\lambda\, d\lambda / \int \rho\lambda_0\, R\lambda\, P\lambda\, d\lambda) \\ D_{mi} &= -\log(\int \rho\lambda i\, G\lambda\, P\lambda\, d\lambda / \int \rho\lambda_0\, G\lambda\, P\lambda\, d\lambda) \\ D_{yi} &= -\log(\int \rho\lambda i\, B\lambda\, P\lambda\, d\lambda / \int \rho\lambda_0\, B\lambda\, P\lambda\, d\lambda) \end{aligned} \quad (2)$$

$(i = 1, 2)$

Where, $Dc_i$, $Dm_i$, and $Dy_i$ are density values magenta, and yellow of a sample (i), respectively; $P_\lambda$ is a spectral intensity distribution of illumination light; and $\rho\lambda_{800}$ is a spectral reflectivity of, e.g., a standard white plate.

As shown in FIG. 2, even when $\rho\lambda_1 = \rho\lambda_2$, as will be understood from expressions (2), there is a possibility of $$(Dc_1, Dm_1, Dy_1) = (Dc_2, Dm_2, Dy_2)$$

depending on the characteristics of the spectral filter of the densitometer.

On the other hand, the same color means that, with respect to three stimulus values $(X_1, Y_1, Z_1)$ and $(X_2, Y_2, Z_2)$ of the respective samples, the following expression is satisfied.

$$(X_1, Y_1, Z_1) = (X_2, Y_2, Z_2) \quad (3)$$

From the definition of three stimulus values, $(X_i, Y_i, Z_i)$ $(i = 1, 2)$ are $$\begin{aligned} X_i &= K \int \rho\lambda_i\, \overline{x}\lambda\, P\lambda\, d\lambda \\ Y_i &= K \int \rho\lambda_i\, \overline{y}\lambda\, P\lambda\, d\lambda \\ Z_i &= K \int \rho\lambda_i\, \overline{z}\lambda\, P\lambda\, d\lambda \end{aligned} \quad (4)$$

In expressions (4), $\overline{x}\lambda$, $\overline{y}\lambda$, and $\overline{z}\lambda$ are three spectral stimulus; $\lambda$ is a spectral intensity distribution; $\rho\lambda_i$ is a spectral reflectivity of the sample i; and K is a constant.

Therefore, in the case as shown in FIG. 2, it is obvious that $(X_1, Y_1, Z_1) \neq (X_2, Y_2, Z_2)$. In other words, in dependence on the characteristic of the filter which is used in the densitometer, even if the quite different colors are used, the respective color density values of the result of the measurement could be equal.

This means that the spectral characteristics of the separating color filter of the three-color separation system coincide with the spectral characteristics of the separating color filter which is used for density measurement. Unless they are coincident, some correction must be carried out to obtain good color reproduction.

The characteristics of spectral filters of various kinds of densitometers which are commercially available at present are not clearly specified. Therefore, the above-mentioned problem occurs and consequently, there is a problem such that those filters cannot be used to accurately examine color reproduction for color printing or color copying, etc.

Hitherto, in spite of the fact that such a problem is a serious problem regarding an essence of color reproduction, it has hardly been examined so far.

SUMMARY OF THE INVENTION

It is an object of the present invention to provide a measuring method whereby an accurate density value of a color material is obtained in consideration of the above-mentioned problems.

Another object of the invention is to provide a color image forming method whereby an accurate and higher quality is obtained from a measurement value.

Still another object of the invention is to provide a color image forming method whereby a color image of an original picture can be reproduced with a high degree of fidelity.

Still another object of the invention is to provide a color image forming method whereby a color image of an original picture can be reproduced with a high degree of fidelity even for any of a plurality of input sources of a color image signal.

Other objects and features of the present invention will become apparent from the following detailed description and the appended claims with reference to the accompanying drawings.

DESCRIPTION OF THE PREFERRED EMBODIMENTS

Figure 1:
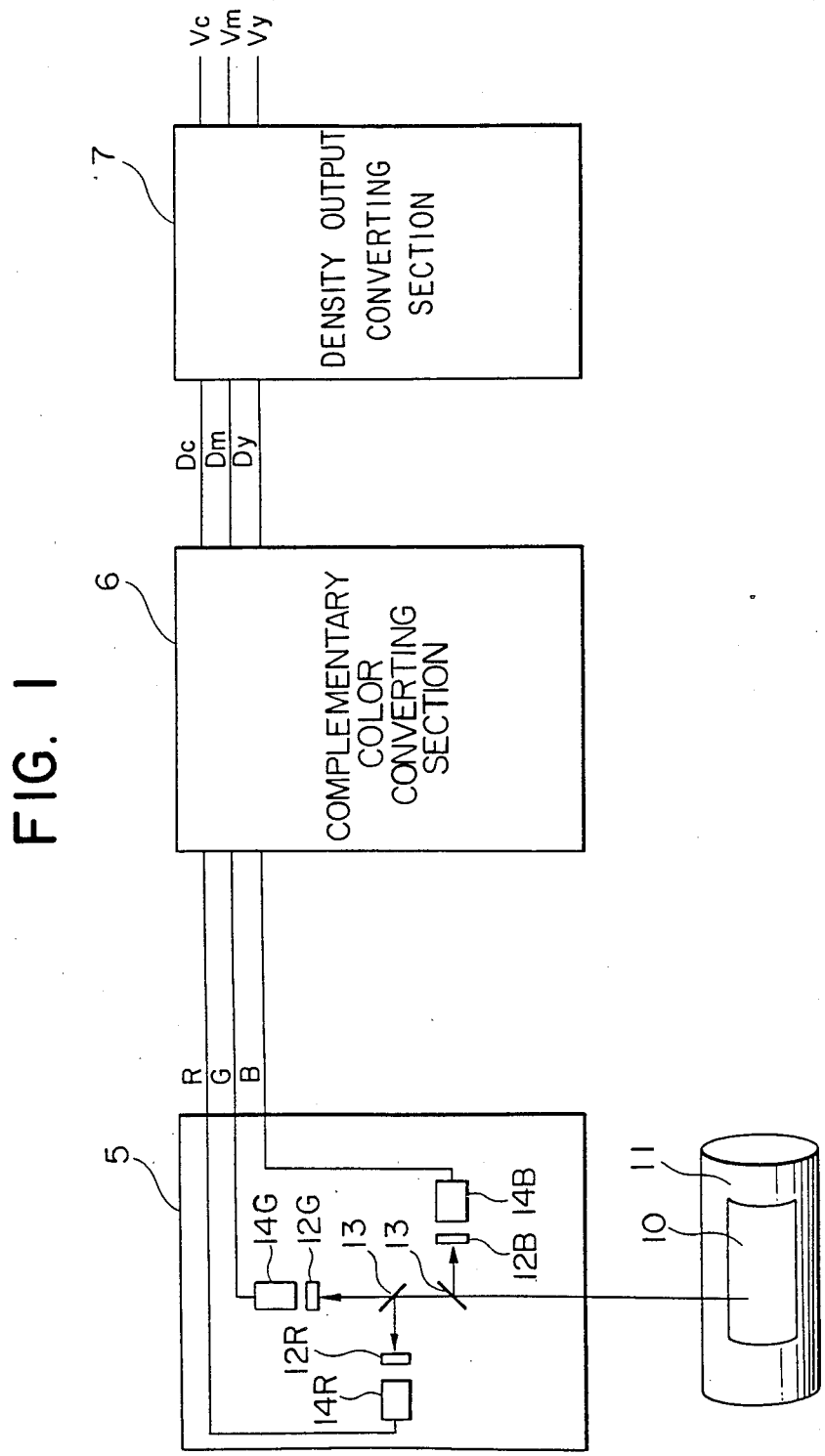
FIG. 1 is a circuit diagram for executing a conventional color reproducing method.
Figure 2:
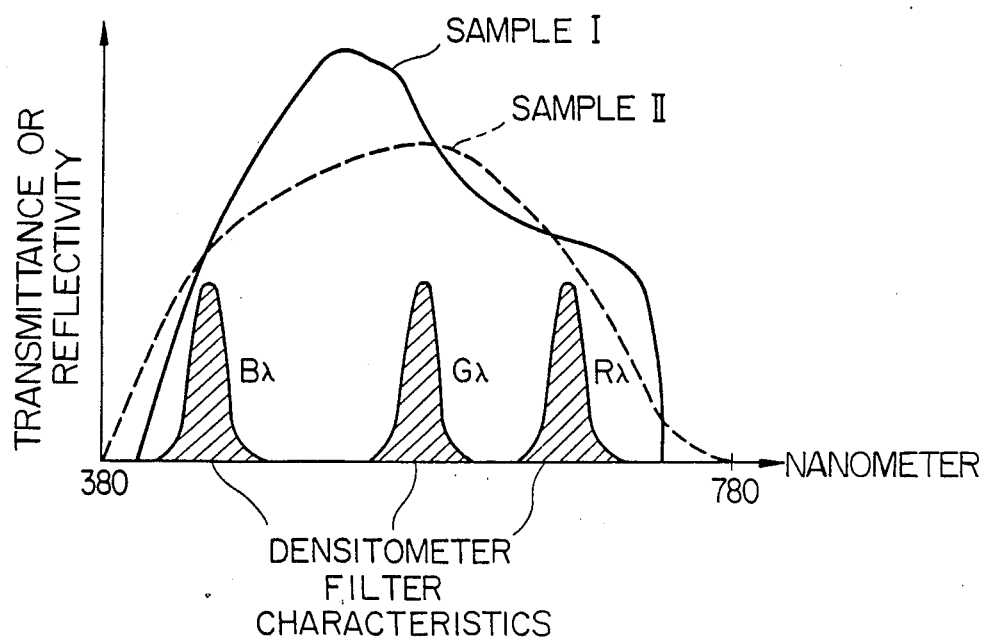
FIG. 2 is an explanatory diagram of a conventional technology in which an axis of abscissa indicates a wavelength and an axis of ordinate denotes a transmittance or reflectivity.

First, a density measurement method of obtaining an ideal density value of a color material will be described.

It is assumed that the characteristic of a spectral filter of a certain densitometer can be expressed by a linear combination of three spectral stimulus values as shown in expressions (5).

$$R\lambda = a_r \bar{x}\lambda + b_r \bar{y}\lambda + c_r \bar{z}\lambda \\ G\lambda = a_g \bar{x}\lambda + b_g \bar{y}\lambda + c_g \bar{z}\lambda \\ B\lambda = a_b \bar{x}\lambda + b_b \bar{y}\lambda + c_b \bar{z}\lambda \quad (5)$$

In this case, each color density can be obtained by substituting expressions (5) for expressions (2). For example, DC becomes as follows $$D_c = -\log\left[\frac{a_r \int \rho\lambda\bar{x}\lambda P\lambda d\lambda + b_r \int \rho\lambda\bar{y}\lambda P\lambda d\lambda + c_r \int \rho\lambda\bar{z}\lambda P\lambda d\lambda}{a_r \int \rho\lambda_0 \bar{x}\lambda P\lambda d\lambda + b_r \int \rho\lambda_0 \bar{x}\lambda P\lambda d\lambda + c_r \int \rho_0\lambda\bar{z}\lambda P\lambda d\lambda}\right] \quad (6)$$

$$= -\log\left[\frac{a_r X + b_r Y + C_r Z}{a_r X_0 + b_r Y_0 + C_r Z_0}\right]$$

Where, X, Y, and Z are three stimulus values and $X_0$, $Y_0$, and $Z_0$ are three stimulus values of, e.g., a standard white plate $$Dc = -\log\left[\frac{a_r X + b_r Y + C_r Z}{a_r X_0 + b_r Y_0 + C_r Z_0}\right] \\ Dm = -\log\left[\frac{a_g X + b_g Y + C_g Z}{a_g X_0 + b_g Y_0 + C_g Z_0}\right] \\ Dy = -\log\left[\frac{a_b X + b_b Y + C_b Z}{a_b X_0 + b_b Y_0 + C_b Z_0}\right] \quad (7)$$

If the density can be defined as a format of logarithm of a linear combination of three stimulus value X, Y, and Z as shown in expressions (7), the above-mentioned problem will be solved. This is because when Dc1, Dm1, Dy1)=(Dc2, Dm2, Dy2) expression (3) is then satisfied.

Therefore, the present invention can be applied to the following two densitometers.

(A) Densitometer in which three stimulus values X, Y, and Z are obtained from the spectral characteristic of a sample and the densities defined by expressions (7) are obtained by way of arithmetic operations based on the result of these stimulus values.

(B) Densitometer in which the characteristic of a spectral filter can be expressed by a linear combination of three spectral stimulus values $\bar{x}\lambda$, $\bar{y}\lambda$, and $\bar{z}\lambda$.

Figure 3:
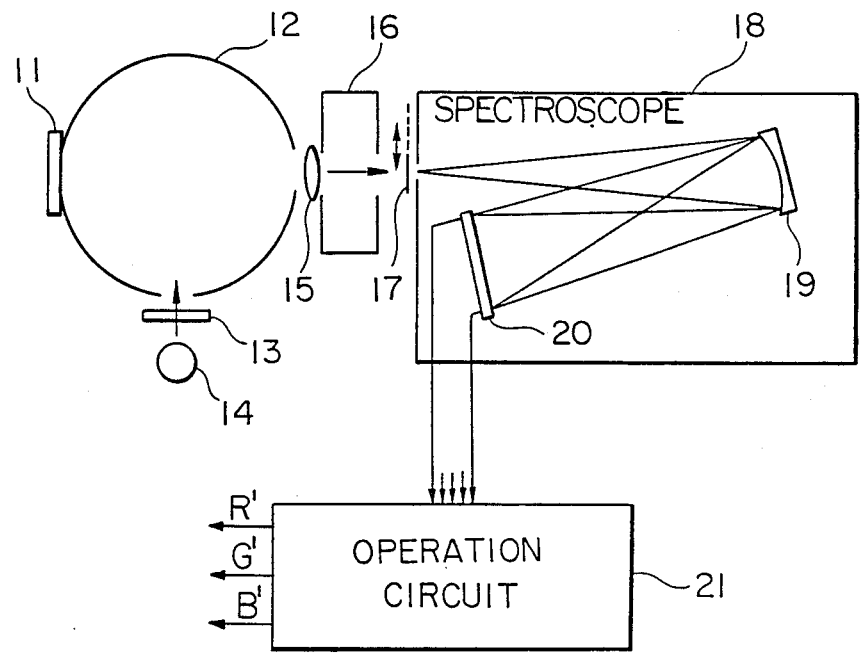
FIG. 3 is a diagram showing an arrangement example of the first embodiment.

An example of an arrangement diagram of the densitometer in the above case (A) is shown in FIG. 3.

In the diagram, reference numeral 11 denotes a sample; 12 an integrating sphere; 13 a filter to cut out the infrared rays; 14 a light source; 15 a lens; 16 a transmission sample chamber; 17 a shutter; 18 a spectroscope; 19 a diffraction grating; 20 a photo diode array; and 21 an operation circuit.

The reflected light of the sample 11 due to the light emitted from the light source 14 enters the spectroscope 18 through the transmission sample chamber 16. The spectrum of the spectroscope 18 is separated by the diffraction grating 19 in dependence on the wavelength components and irradiated onto the photo diode array 20.

The lights irradiated onto the photo diode array 20 are converted to electrical signals each indicative of a reflectivity corresponding to each wavelength. These signals are input to the operation circuit 21, so that three stimulus values X, Y, and Z are calculated on the basis of Japanese Industrial Standard JIS Z 8722. Further, the operation circuit 21 calculates the density values of each color from three stimulus values X, Y, and Z in accordance with expressions (7), so that the density values of each color are derived. As a matrix for use in expressions (7), it is possible to properly select any matrix such as $$\begin{pmatrix} a_r & b_r & c_r \\ a_g & b_g & c_g \\ a_b & b_b & c_b \end{pmatrix} = \begin{pmatrix} 1 & 0 & 0 \\ 0 & 1 & 0 \\ 0 & 0 & 1 \end{pmatrix} \quad (8)$$

or $$= \begin{pmatrix} 1.9106 & -0.5326 & -0.2883 \\ -0.9843 & 1.9984 & -0.0283 \\ 0.0584 & -0.1185 & 0.8985 \end{pmatrix} \quad (9)$$

in accordance with an object.

In particular, the matrix (9) is preferable for use in a video printer or the like since the transformation matrix between the X-Y-Z system and the R-G-B system of the NTSC system is used as coefficients.

Figure 4A:
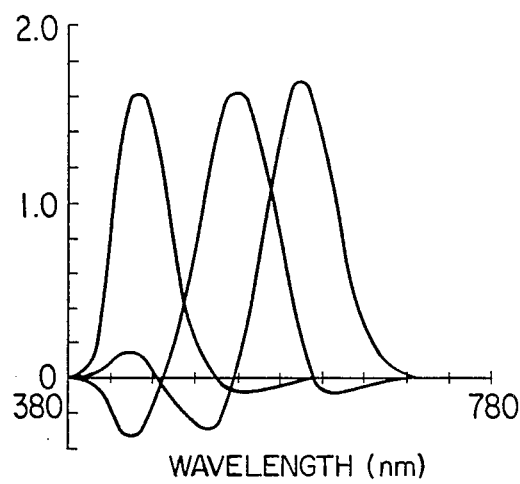
FIGS. 4A and 4B diagrams showing examples of spectral characteristics.
Figure 4B:
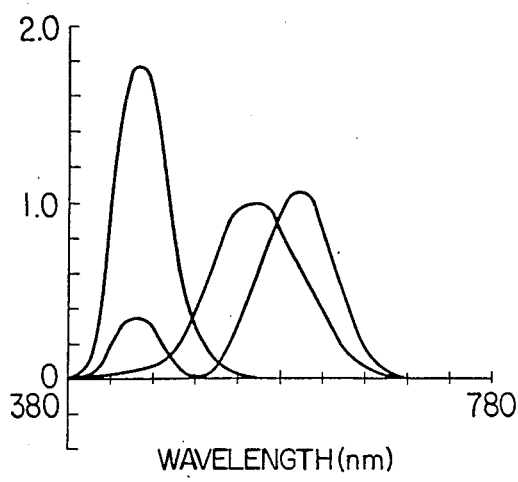

FIG. 4A shows the spectral characteristic in the case of matrix (9). FIG. 4B shows the spectral characteristic in the case of matrix (8).

Figure 5:
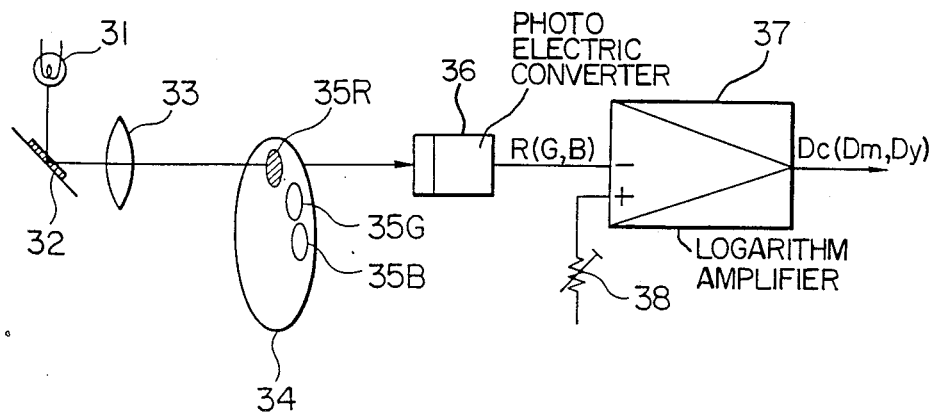
FIG. 5 is a diagram showing an arrangement example of the second embodiment.

FIG. 5 shows an example of an arrangement diagram of the densitometer in the case of matrix (9).

In the diagram, reference numeral 31 denotes a white light source; 32 is a sample; 33 a lens; 34 a filter disc; 35R a red filter with the spectral characteristic Rλ; 35G and 35B green and blue filters with the spectral characteristics Gλ and Bλ, respectively; 36 a photoelectric converter; 37 a logarithm amplifier; and 38 a variable resistor.

As the filters 35R, 35G, and 35B, any filters may be used if their spectral characteristics are approximately expressed by a linear combination of three spectral stimulus values as shown in expressions (5), respectively. However, in this case, the realizable filter cannot reproduce the negative characteristic; therefore, the case of matrix (8) is widely applicable in this sense.

In the arrangement of FIG. 5, when the filter 35R is interposed on the optical axis, the cyan density Dc is obtained from the logarithm amplifier 37. On one hand, when the filter 35G or 35B is interposed, the magenta density Dm or yellow density Dy is derived, respectively.

As described above, according to the density measuring method of the present invention, it is possible to measure the optical density having the distinct definition relative to the study of coloring instead of a conventional optical density which is vaguely defined, so that it is possible to provide the data which enables more accurate color to be reproduced in the field such as a color printing or the like. Thus, this method has an extremely high industrial applicable value.

Explanation will then be made with regard to an embodiment in which an input color signal is processed using the density value derived by way of the above-described method.

Figure 6:
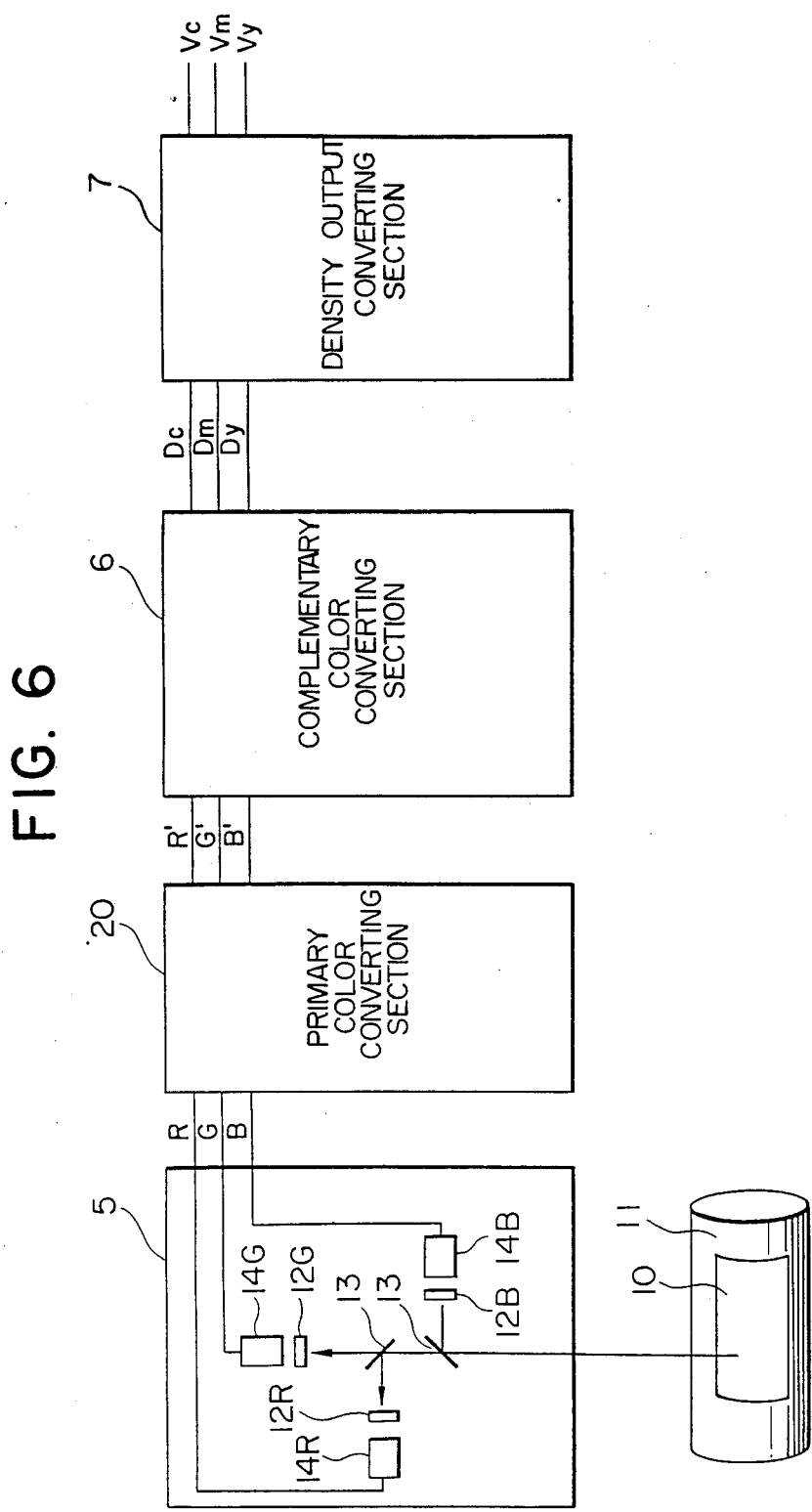
FIG. 6 is a circuit diagram of an embodiment of the present invention.

FIG. 6 shows a schematic block diagram for performing a color image process. In FIG. 6, the parts and components having the functions similar to those in FIG. 1 are designated by the same reference numeral.

The spectral characteristics of the color filters $R_\lambda$, $G_\lambda$, and $B_\lambda$ in a three-color separating section 5 and the spectral characteristics of the color filters $R'_\lambda$, $G'_\lambda$, and $B'_\lambda$ in the densitometer are approximated by linear combinations of three spectral stimulus values $\bar{x}_\lambda$, $\bar{y}_\lambda$, and $\bar{z}_\lambda$ as follows.

$$\begin{pmatrix} R_\lambda \\ G_\lambda \\ B_\lambda \end{pmatrix} \simeq \begin{pmatrix} a_{11} & a_{12} & a_{13} \\ a_{21} & a_{22} & a_{23} \\ a_{31} & a_{32} & a_{33} \end{pmatrix} \begin{pmatrix} \bar{x}_\lambda \\ \bar{y}_\lambda \\ \bar{z}_\lambda \end{pmatrix} = A \begin{pmatrix} \bar{x}_\lambda \\ \bar{y}_\lambda \\ \bar{z}_\lambda \end{pmatrix} \quad (12)$$

$$\begin{pmatrix} R'_\lambda \\ G'_\lambda \\ B'_\lambda \end{pmatrix} \simeq \begin{pmatrix} b_{11} & b_{12} & b_{13} \\ b_{21} & b_{22} & b_{23} \\ b_{31} & b_{32} & b_{33} \end{pmatrix} \begin{pmatrix} \bar{x}_\lambda \\ \bar{y}_\lambda \\ \bar{z}_\lambda \end{pmatrix} = B \begin{pmatrix} \bar{x}_\lambda \\ \bar{y}_\lambda \\ \bar{z}_\lambda \end{pmatrix} \quad (13)$$

These approximate expressions can be easily obtained by measuring the spectral characteristics of the actual filters and applying a method of least squares to these measured values.

On one hand, in the case where the density values are obtained by way of the method shown in FIGS. 3 to 5, parameters which are used in this case may be directly used as coefficients of $\{b_{ij}\}$. In this case, the next matrix transformation is performed in a primary color converting section 20 which is newly provided.

$$\begin{pmatrix} R' \\ G' \\ B' \end{pmatrix} = BA^{-1} \begin{pmatrix} R \\ G \\ B \end{pmatrix} = T \begin{pmatrix} R \\ G \\ B \end{pmatrix} \quad (14)$$

Thereafter, the complementary color conversion is carried out in accordance with expressions (1).

$$\begin{pmatrix} Dc \\ Dm \\ Dy \end{pmatrix} = \begin{pmatrix} -\log R'/R'_0 \\ -\log G'/G'_0 \\ -\log B'/B'_0 \end{pmatrix} \quad (15)$$

This method is preferable because of the following reasons. The outputs R, G, and B of the three-color separation system become $$\begin{pmatrix} R \\ G \\ B \end{pmatrix} = A \begin{pmatrix} X \\ Y \\ Z \end{pmatrix} \quad (16)$$

since the characteristics of their spectral filters are $$\begin{pmatrix} R_\lambda \\ G_\lambda \\ B_\lambda \end{pmatrix} = A \begin{pmatrix} \bar{x}_\lambda \\ \bar{y}_\lambda \\ \bar{z}_\lambda \end{pmatrix}$$

Therefore, the outputs R', G', B' which are derived by primary-color converting those outputs R, G, and B become $$\begin{pmatrix} R' \\ G' \\ B' \end{pmatrix} = AB^{-1} \begin{pmatrix} R \\ G \\ B \end{pmatrix} = B \begin{pmatrix} X \\ Y \\ Z \end{pmatrix} \quad (17)$$

Further, the outputs Dc, Dm, and Dy which are obtained by complementary-color converting the outputs R', G', and B' become $$\begin{aligned} Dc &= -\log [(b_{11}X + b_{12}Y + b_{13}Z)/ \\ & \quad (b_{11}X_0 + b_{12}Y_0 + b_{13}Z_0)] \\ Dm &= -\log [(b_{21}X + b_{22}Y + b_{23}Z)/ \\ & \quad (b_{21}X_0 + b_{22}Y_0 + b_{23}Z_0)] \\ Dy &= -\log [(b_{31}X + b_{32}Y + b_{33}Z)/ \\ & \quad (b_{31}X_0 + b_{32}Y_0 + b_{33}Z_0)] \end{aligned} \quad (18)$$

($X_0$, $Y_0$, and $Z_0$ are three stimulus values of 0 (for example, standard white plate))

On one hand, from the definition, X, Y, and Z are $$\begin{aligned} X &= K_1 \int \rho\lambda x\lambda P\lambda d\lambda \\ Y &= K_1 \int \rho\lambda y\lambda P\lambda d\lambda \\ Z &= K_1 \int \rho\lambda z\lambda P\lambda d\lambda \end{aligned} \quad (19)$$

Where,
$\rho\lambda$: spectral reflectivity of a sample
$P\lambda$: spectral intensity distribution of the illumination light
$K_1$: constant For example, Dc can be expressed as follows.

$$\begin{aligned} Dc &= -\log \frac{\int \rho\lambda(b_{11}\bar{x}\lambda + b_{12}\bar{y}\lambda + b_{13}\bar{z}\lambda) \cdot P\lambda d\lambda}{\int \rho\lambda 0(b_{11}\bar{x}\lambda + b_{12}\bar{y}\lambda + b_{13}\bar{z}\lambda) \cdot P\lambda d\lambda} \\ &= -\log \frac{\int \rho\lambda \cdot R'\lambda P\lambda d\lambda}{\int \rho\lambda 0 \cdot R'\lambda P\lambda d\lambda} \end{aligned} \quad (20)$$

From this expression, it will be appreciated that Dc must be the density measured by the densitometer having the spectral characteristic $R'\lambda$. In other words, without the newly provided primary-color converting section, the density value for use in the process and the density value which is actually measured are quite different, so that the accurate color reproduction cannot be derived in principle.

Figure 7:
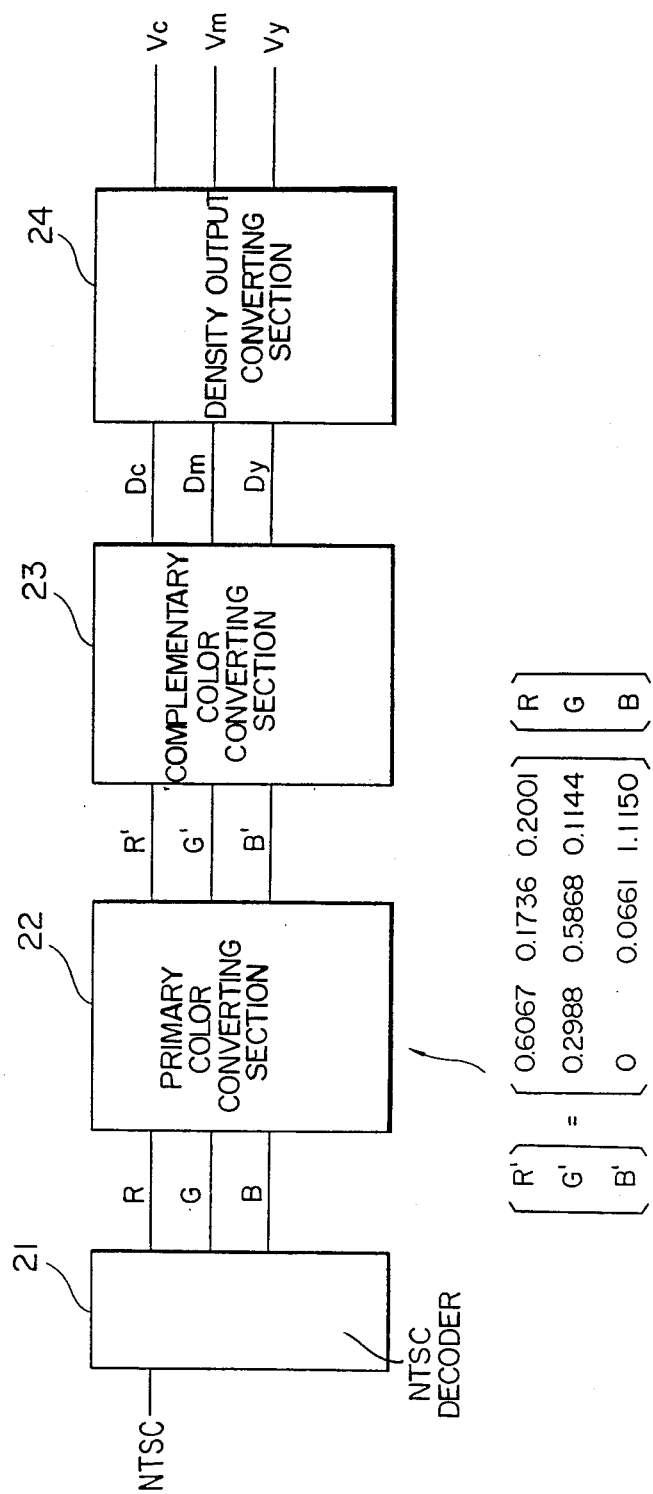
FIG. 7 is a circuit diagram of another embodiment.

FIG. 7 shows a block diagram for a color process in the case where the present invention is applied to a color video printer which is connected to a television system of the NTSC system. In the diagram, reference numeral 21 denotes an NTSC decoder; 22 is a primary converting section; 23 is a complementary converting section; and 24 is a density-output converting section. In this case, the density values to be used are measured by use of the method whereby they are calculated from the values of X, Y, and Z shown in FIGS. 3 to 5 mentioned before.

Practically speaking, (X, Y, Z) of a sample are measured by a colorimeter and the density values are calculated by expressions (18). In this case, a matrix B can be arbitrarily set.

For simplicity, it is assumed that $$B = \begin{pmatrix} 1 & 0 & 0 \\ 0 & 1 & 0 \\ 0 & 0 & 1 \end{pmatrix} \quad (21)$$

On one hand, color television signals of the NTSC system are also the results of the three-color separation by way of a color television camera or the like and they are specified as follows on the basis of the NTSC standard.

$$\begin{pmatrix} R \\ G \\ B \end{pmatrix} = \begin{pmatrix} 1.9106 & -0.5326 & -0.2883 \\ -1.9843 & 1.9984 & -0.0283 \\ 0.0584 & -0.1185 & 0.8985 \end{pmatrix} \begin{pmatrix} X \\ Y \\ Z \end{pmatrix}$$

Therefore, with the same parameters, the characteristic of the three-color separation filter of an ideal color camera becomes $$\begin{pmatrix} R\lambda \\ G\lambda \\ B\lambda \end{pmatrix} = \begin{pmatrix} 1.9106 & -0.5326 & -0.2883 \\ -1.9843 & 1.9984 & -0.0283 \\ 0.0584 & -0.1185 & 0.8985 \end{pmatrix} \begin{pmatrix} \bar{x}\lambda \\ \bar{y}\lambda \\ \bar{z}\lambda \end{pmatrix}$$

Thus, in the system of FIG. 7, a transformation matrix of the primary converting section 22 may be set to $$T = \begin{pmatrix} 0.6067 & 0.1736 & 0.2001 \\ 0.2988 & 0.5868 & 0.1144 \\ 0 & 0.0661 & 1.1150 \end{pmatrix} \begin{pmatrix} R \\ G \\ B \end{pmatrix}$$

In addition, as another method for implementation, contrarily, the matrices B and T may be set as follows.

$$B = \begin{pmatrix} 1.9106 & -0.5326 & -0.2883 \\ -1.9843 & 1.9984 & -0.0283 \\ 0.0584 & -0.1185 & 0.8985 \end{pmatrix}$$

$$T = \begin{pmatrix} 1 & 0 & 0 \\ 0 & 1 & 0 \\ 0 & 0 & 1 \end{pmatrix}$$

On the other hand, in FIG. 7, other systems PAL, SECAM) are also similarly constituted and the invention can be realized by merely changing coefficients of a primary-color transformation matrix.

Further, even in the case of inputting using a color scanner as well, the characteristic of a three-color separating filter of the scanner is approximated as a linear combination of three spectral stimulus values using a method of least squares and a primary-color transformation matrix may be constituted using parameters of weights at this time.

Figure 8:
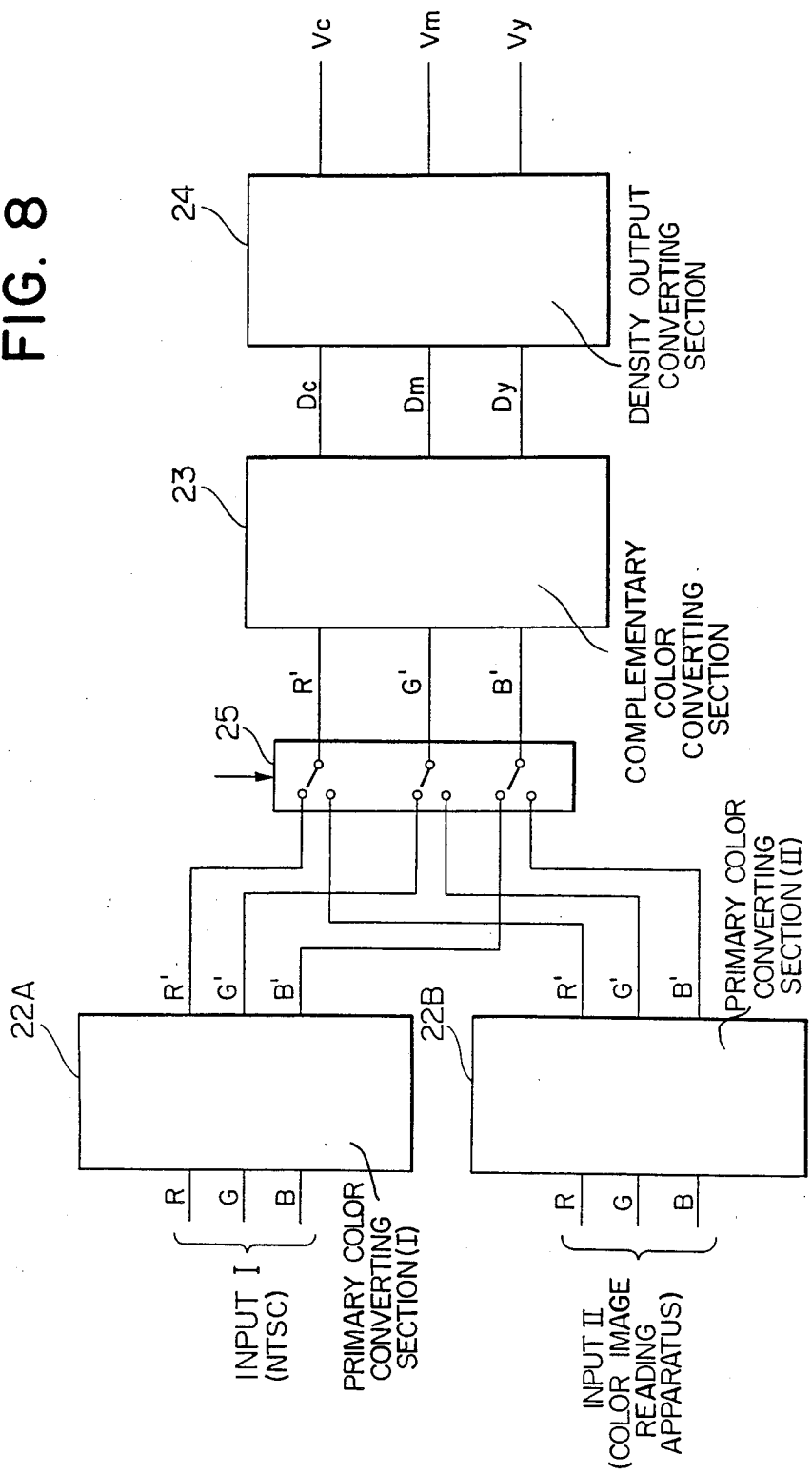
FIG. 8 is a circuit diagram of a further embodiment.

FIG. 8 is a block diagram for a signal process of a color printer which can input two different inputs of the primary-color system. In the diagram, reference numerals 22A and 22B denote different primary converting sections which are provided in correspondence to inputs of, e.g., the NTSC system and to inputs from a color reading apparatus. A numeral 25 indicates an input change-over switch. By switching the inputs by the switch 25 in accordance with the input system, the optimum color according to the input system can be reproduced.

As described above, according to the present invention, by performing the primary-color conversion to correct the relation among the density values and the three-color separation system, even when the density values are used, the accurate color can be reproduced.

The present invention is not limited to the foregoing embodiments but many modifications and variations are possible within the spirit and scope of the appended claims of the invention.

What I claimed is:

1. A method of optically measuring chromatic densities of a sample, comprising the steps of:
   deriving three stimulus values X, Y and Z of light reflected by the sample; and
   determining a cyan density, a magenta density and a yellow density of the sample using said stimulus values X, Y and Z derived and three stimulus values $X_0$, $Y_0$ and $Z_0$ of a standard color.

2. A method according to claim 1, wherein said deriving step includes the steps of:
   separating the reflected light into wavelength components with a diffraction grating;
   detecting intensities of the wavelength components obtained from the separated light; and
   calculating the three stimulus values X, Y and Z from the detected intensities.

3. A method according to claim 1, wherein the standard color is white.

4. A method according to claim 1, wherein said determining step includes the step of:
   performing the calculations $$Dc = -\log[(a_r X + b_r Y + c_r Z)/(a_r X_0 + b_r Y_0 + c_r Z_0)]$$

$$Dm = -\log[(a_g X + b_g Y + c_g Z)/(a_g X_0 + b_g Y_0 + c_g Z_0)]$$

$$Dy = -\log[(a_b X + b_b Y + c_b Z)/(a_b X_0 + b_b Y_0 + c_b Z_0)]$$

to obtain the cyan density (Dc), the magenta density (Dm) and the yellow density (Dy), wherein $a_r$, $b_r$, $c_r$, $a_g$, $b_g$, $c_g$, $a_b$, $b_b$, $c_b$, are constants.

5. A method of optically measuring chromatic densities of a sample, comprising the steps of:
   obtaining a photoelectric conversion signal from a light flux from the sample;
   deriving three stimulus values X, Y and Z from the photoelectric conversion signal obtained by said obtaining step;
   determining a cyan density, a magenta density and a yellow density of the sample using the derived stimulus values X, Y and Z and three stimulus values $X_0$, $Y_0$ and $Z_0$ of a standard color; and
   outputting the cyan density, magenta density and yellow density respectively determined by said determining step.

6. A method according to claim 5, wherein the standard color is white.

7. A method according to claim 5, wherein said determining step includes the step of:
   performing the calculations $$Dc = -\log[(a_r X + b_r Y + c_r Z)/(a_r X_0 + b_r Y_0 + c_r Z_0)]$$

$$Dm = -\log[(a_g X + b_g Y + c_g Z)/(a_g X_0 + b_g Y_0 = c_g Z_0)]$$

$$Dy = -\log[(a_b X + b_b Y + c_b Z)/(a_b X_0 + b_b Y_0 + c_b Z_0)]$$

to obtain the cyan density (Dc), the magenta density (Dm) and the yellow density (Dy), wherein $a_r$, $b_r$, $c_r$, $a_g$, $b_g$, $c_g$, $a_b$, $b_b$, and $c_b$ are constants.

8. An apparatus for optically measuring chromatic densities of a sample, comprising:
   means for deriving three stimulus values X, Y and Z of light reflected by the sample; and
   means for determining a cyan density, a magenta density and a yellow density of the sample using said derived stimulus values X, Y and Z and three stimulus values $X_0$, $Y_0$ and $Z_0$ of a standard color.

9. An apparatus according to claim 8, wherein said deriving means includes:
   means for separating the reflected light into wavelength components with a diffraction grating;
   means for detecting intensities of the wavelength components obtained from the separated light; and
   means for calculating the three stimulus values X, Y and Z from the detected intensities.

10. An apparatus according to claim 8, wherein the standard color is white.

11. An apparatus according to claim 8, wherein said determining means includes performing means for performing the calculations $$Dc = -\log[(a_r X + b_r Y + c_r Z)/(a_r X_0 + b_r Y_0 + c_r Z_0)]$$

$$Dm = -\log[(a_g X + b_g Y + c_g Z)/(a_g X_0 + b_g Y_0 + c_g Z_0)]$$

$$Dy = -\log[(a_b X + b_b Y + c_b Z)/(a_b X_0 + b_b Y_0 + c_b Z_0)]$$

to obtain the cyan density (Dc), the magenta density (Dm) and the yellow density (Dy), wherein $a_r$, $b_r$, $c_r$, $a_g$, $b_g$, $c_g$, $a_b$, $b_b$, and $c_b$ are constants.

* * * * *